United States Patent
Challa et al.

(10) Patent No.: US 10,387,180 B2
(45) Date of Patent: Aug. 20, 2019

(54) HYPERVISOR CONTROLLED REDUNDANCY FOR I/O PATHS USING VIRTUALIZED I/O ADAPTERS

(71) Applicant: International Business Machines Corporation, Armonk, NY (US)

(72) Inventors: Narsimha R. Challa, Andhra Pradesh (IN); Eric P. Fried, Austin, TX (US); Swaroop Jayanthi, Bangalore (IN); Sailaja R. Keshireddy, Hyderabad (IN)

(73) Assignee: International Business Machines Corporation, Armonk, NY (US)

( * ) Notice: Subject to any disclaimer, the term of this patent is extended or adjusted under 35 U.S.C. 154(b) by 169 days.

(21) Appl. No.: 14/792,672

(22) Filed: Jul. 7, 2015

(65) Prior Publication Data
US 2017/0010907 A1    Jan. 12, 2017

(51) Int. Cl.
G06F 9/455    (2018.01)

(52) U.S. Cl.
CPC ............ *G06F 9/45558* (2013.01); *G06F 2009/45579* (2013.01); *G06F 2009/45583* (2013.01)

(58) Field of Classification Search
CPC ........ G06F 9/45558; G06F 2009/45579; G06F 2009/45583
USPC ......................................................... 718/1
See application file for complete search history.

(56) References Cited

U.S. PATENT DOCUMENTS

| | | | |
|---|---|---|---|
| 7,493,407 B2 | 2/2009 | Leedom et al. | |
| 7,774,794 B2 * | 8/2010 | Panesar | G06F 13/105 710/107 |
| 7,783,779 B1 * | 8/2010 | Scales | G06F 9/5077 709/207 |
| 8,046,764 B2 * | 10/2011 | Yamakabe | G06F 9/5072 709/226 |
| 8,332,849 B2 * | 12/2012 | Solomon | G06F 9/5061 710/1 |
| 9,201,681 B2 * | 12/2015 | Bert | G06F 9/45558 |
| 2011/0296234 A1 | 12/2011 | Oshins et al. | |
| 2012/0179844 A1 | 7/2012 | Brownlow et al. | |
| 2013/0160002 A1 * | 6/2013 | Graham | G06F 9/45558 718/1 |
| 2013/0254767 A1 * | 9/2013 | Mizuno | G06F 9/455 718/1 |

(Continued)

OTHER PUBLICATIONS

Challa, Narsimha Reddy. "Hardware based i/o virtualization technologies for hypervisors, configurations and advantages—a study." Cloud Computing in Emerging Markets (CCEM), 2012 IEEE International Conference on. IEEE, 2012. pp. 1-5.*

(Continued)

*Primary Examiner* — James J Lee
*Assistant Examiner* — Willy W Huaracha
(74) *Attorney, Agent, or Firm* — Michael A. Petrocelli

(57) ABSTRACT

A method, system, and program product for hypervisor controlled redundancy for Input/Output (I/O) paths using virtualized I/O adapters is provided. A hypervisor detects a virtual machine exceeding a pre-defined bandwidth threshold. The hypervisor searches a shared pool of free virtual functions (VF) for a free VF. If the shared pool of free VFs is not depleted, a free VF is allocated to the virtual machine (VM). If the shared pool of free VFs is depleted, the active VMs are examined for VF capacity that may be donated to the triggering VM.

12 Claims, 3 Drawing Sheets

(56) References Cited

U.S. PATENT DOCUMENTS

| | | | |
|---|---|---|---|
| 2014/0007097 A1* | 1/2014 | Chin | G06F 9/45533 718/1 |
| 2014/0137110 A1* | 5/2014 | Engle | G06F 9/5022 718/1 |
| 2015/0212840 A1* | 7/2015 | Biran | G06F 9/45558 718/1 |
| 2016/0092259 A1* | 3/2016 | Mehta | G06F 9/45558 718/1 |
| 2016/0342437 A1* | 11/2016 | Khemani | G06F 9/45558 |

OTHER PUBLICATIONS

Disclosed Anonymously, "Single Route I/O Virtualization—Dynamic Network Optimizer," An IP.com Prior Art Database Technical Disclosure, IP.com No. IPCOM000231850D, Oct. 9, 2013, 6 pages.

WMWARE, "What's New in Performance in VMware vSphere™ 5.0," Technical White Paper, VMware, Inc., Palo Alto, CA, Item No. VMW-WP-Performance-USLET-101, 2011, 11 pages.

VMWARE, "Complete Virtual Platform," .vmware.com/why-choose-vmware/virtual-platform/allocation.html, accessed on Jan. 9, 2015, 4 pages.

* cited by examiner

HYPERVISOR CONTROLLED REDUNDANCY FOR I/O PATHS USING VIRTUALIZED I/O ADAPTERS

BACKGROUND

This disclosure relates generally to computer system resource virtualization, and more particularly to hypervisor controlled redundancy for Input/Output (I/O) paths using virtualized I/O adapters.

Redundant physical I/O paths, where multiple physical paths exist from a computer to the storage devices, are commonly defined to provide high availability for applications executing on the computer. However a large computing environment, such as a cloud cluster of physical servers, may host several hundred virtual machines (VM) on the physical servers. To achieve I/O path redundancy in this virtual environment, traditionally may require at least two physical adapters for each VM, increasing both total cost of ownership and system administration complexity.

In an alternate solution, configuring Single Root I/O Virtualization (SRIOV) adapters in the computing environment provides the required path redundancy, through the multiple virtual functions (VF) available in each SRIOV adapter. While an improvement over multiple physical adapters, both physical adapters and SRIOV adapters require manual configuration to implement path redundancy. Manual configuration, being error prone, may lead to a single point of failure within the computing environment. Additionally, unless expertly configured and continually monitored with specialized performance management software, poor utilization of the adapter's bandwidth may result.

SUMMARY

According to one embodiment, a method for hypervisor controlled redundancy for Input/Output (I/O) paths using virtualized I/O adapters is provided. The method includes detecting a triggering virtual machine (VM) exceeding a pre-defined bandwidth usage threshold. The method includes searching a shared pool of free virtual functions (VF) for a free VF. The hypervisor allocates a free VF to the triggering VM, in response to the free VF being located in the shared pool of free VFs. The hypervisor searches a plurality of active VMs for VF capacity to donate to the triggering VM, based on the shared pool of free VFs being depleted.

According to another embodiment, a computer program product for hypervisor controlled redundancy for Input/Output (I/O) paths using virtualized I/O adapters is provided. The computer program product includes a computer readable storage device readable by a processing circuit and storing instructions for execution by the processing circuit for performing a method is provided. The method includes detecting a triggering virtual machine (VM) exceeding a pre-defined bandwidth usage threshold. The method includes searching a shared pool of free virtual functions (VF) for a free VF. The hypervisor allocates a free VF to the triggering VM, in response to the free VF being located in the shared pool of free VFs. The hypervisor searches a plurality of active VMs for VF capacity to donate to the triggering VM, based on the shared pool of free VFs being depleted.

According to another embodiment, a computer system for hypervisor controlled redundancy for Input/Output (I/O) paths using virtualized I/O adapters is provided. The computer system includes a memory, a processing unit communicatively coupled to the memory, and a management module communicatively coupled to the memory and processing unit, whereby the management module is configured to perform the steps of a method is provided. The method includes detecting a triggering virtual machine (VM) exceeding a pre-defined bandwidth usage threshold. The hypervisor searches a shared pool of free virtual functions (VF) for a free VF. The hypervisor allocates the free VF to the triggering VM, in response to the free VF being located in the shared pool of free VFs. The hypervisor searches a plurality of active VMs for VF capacity to donate to the triggering VM, based on the shared pool of free VFs being depleted.

BRIEF DESCRIPTION OF THE SEVERAL VIEWS OF THE DRAWINGS

For a more complete understanding of this disclosure, reference is now made to the following brief description, taken in conjunction with the accompanying drawings and detailed description, wherein like reference numerals represent like parts.

DETAILED DESCRIPTION

Although an illustrative implementation of one or more embodiments is provided below, the disclosed systems and/or methods may be implemented using any number of techniques. This disclosure should in no way be limited to the illustrative implementations, drawings, and techniques illustrated below, including the exemplary designs and implementations illustrated and described herein, but may be modified within the scope of the appended claims along with their full scope of equivalents.

Redundant physical Input/Output (I/O) paths, where multiple physical paths exist from a computer to the storage devices, are commonly defined using multiple physical adapters. A computing environment, such as a cloud cluster of physical servers, may host several hundred virtual machines (VM), requiring at least two physical adapters per VM to provide redundant paths. Alternatively, configuring Single Root I/O Virtualization (SRIOV) adapters in the computing environment may provide the required path redundancy. However, both physical adapters and SRIOV adapters require manual configuration to implement path redundancy. Manual configuration, being error prone, may lead to a single point of failure within the computing environment, and may result in poor utilization of the adapter's bandwidth. The following described exemplary embodiments provide an enhanced hypervisor in a system, method and program product for hypervisor controlled redundancy for I/O paths using virtualized I/O adapters. This simplifies configuring I/O resources to VMs by shielding a systems administrator from the complexity of the configuration operations, and provides higher resource utilization. Additionally, adding multi-pathing software to the operating system to provide and manage redundant I/O paths is no longer required.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit", "module", or "system". Furthermore, aspects of the present invention may take the form of a computer program product embodied in one or more computer readable medium(s) having computer readable program code embodied thereon.

Aspects of the present disclosure are described below with reference to flowchart illustrations and/or block diagrams of methods, apparatus, (systems), and computer program products according to embodiments of the invention. It will be understood that each block of the flowchart illustrations and/or block diagrams, and combinations of blocks in the flowchart illustrations and/or block diagrams, can be implemented by computer program instructions.

Figure 1:
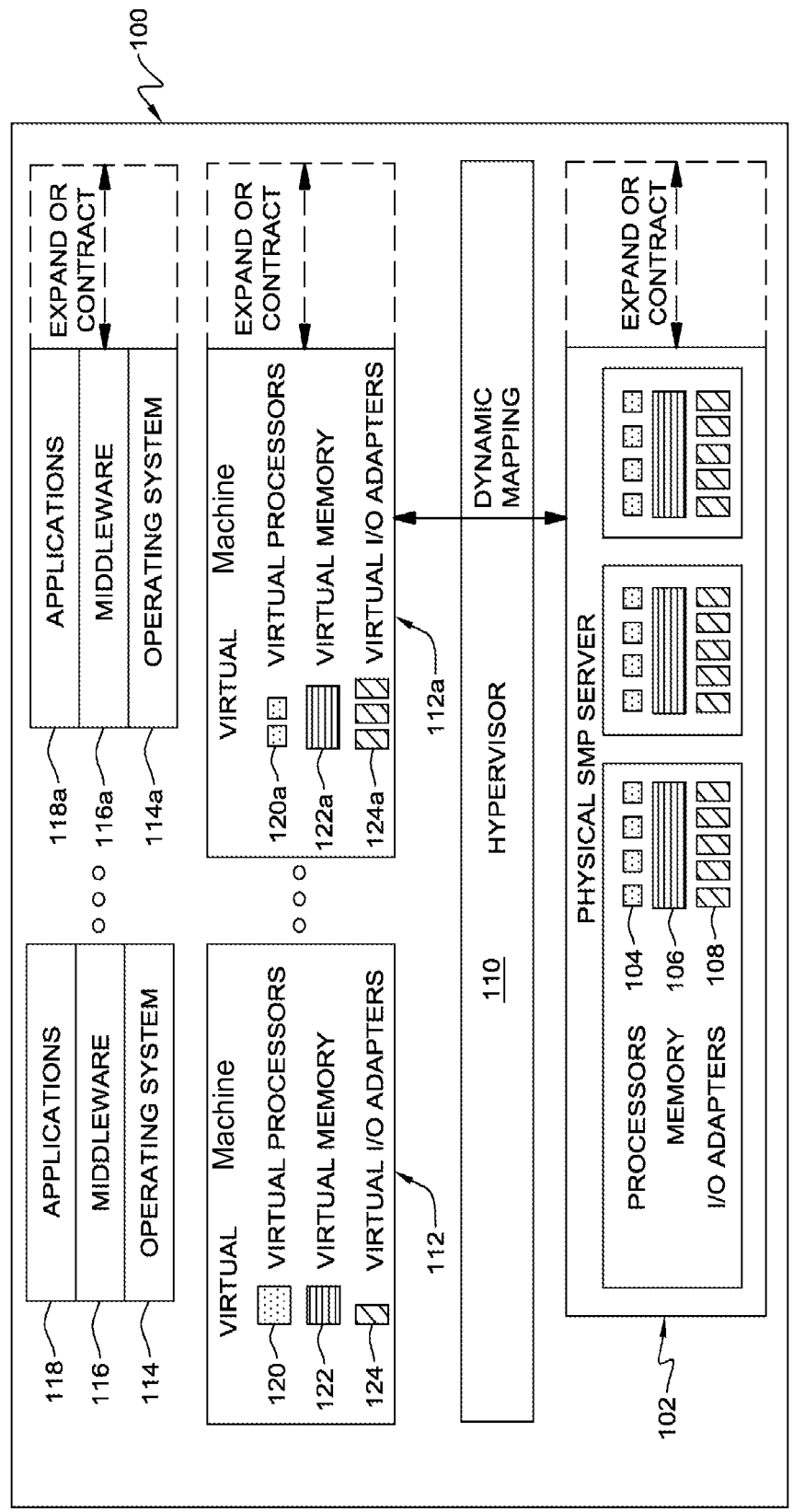
FIG. 1 illustrates an exemplary computing node operable for various embodiments of the disclosure.

FIG. 1 is a block diagram of a data processing system or computer system 100. The computer 100 includes physical hardware devices that can be mapped to, i.e., temporarily owned by, a VM for the execution of its applications.

The computer system 100 includes a physical server 102. The physical server 102 includes physical hardware devices such as processors 104, memory 106, and/IO adapters 108. These physical devices are managed by the hypervisor 110, which may also be referred to as a partition manager or virtual machine monitor. The processors 104 are shared processors and each may be a simultaneous multithreading (SMT)-capable processor that is capable of concurrently executing multiple different threads on the processor.

A VM, also referred to as a virtual server, guest, or logical partition, is a proxy for a physical server that has the same capabilities, interfaces, and state. VMs 112 are created and managed by a hypervisor 110 that resides on the computer system 100. A VM appears to be a physical server to its user: the operating system, middleware, and application software that run upon it. The computer system 100 includes one or more VMs such as VM 112 and VM 112a.

Each VM appears to the software executing thereon to include its own processor(s), memory, and I/O adapter(s) that are available for the exclusive use of that VM. For example, VM 112 includes virtual processors 120, virtual memory 122, and virtual I/O adapters 124. VM 112a includes virtual processors 120a, virtual memory 122a, and virtual I/O adapters 124a.

Each VM supports its own software environment, including an operating system, middleware, and applications. The software environment of each VM may be different from the software environments of other VMs. For example, the operating systems executed by each VM may differ from one another.

For example, the VM 112 supports the operating system 114, middleware 116, and applications 118. The VM 112a supports the operating system 114a, middleware 116a, and applications 118a. The operating systems 114 and 114a may be the same or different operating systems.

A VM is a logical description of a server that defines a server environment that acts, to a user, as if it were a physical server, being accessed and providing information in the same way as a physical server. The virtual processors, virtual memory, and virtual I/O adapters that are defined for each VM are logical substitutes for physical processors, memory, and I/O adapters.

The hypervisor 110 manages the mapping between the VMs with their virtual processors, virtual memory, and virtual I/O adapters and the physical hardware devices that are selected to implement these virtual devices. For example, when a virtual processor is dispatched, a physical processor, such as one of the physical processors 104, is selected by the hypervisor 110 to be used to execute and implement that virtual processor. The hypervisor 110 manages the selections of physical devices and their temporary assignment to virtual devices.

The hypervisor 110 services all of the VMs, or logical partitions, during a dispatch time slice. The dispatch time slice is a particular length of time, such as 5 milliseconds. During each dispatch time slice, the hypervisor 110 will allocate, or assign, the physical processor to each logical partition. When the logical partition has been allocated time on the physical processor, the virtual processors defined by that logical partition will be executed by the physical processor.

The hypervisor 110 is responsible for dynamically creating, managing, and destroying VMs. Whole virtual processors, virtual I/O adapters, and virtual memory blocks can be removed or added by the hypervisor 110. The hypervisor 110 is also responsible for dynamic resource allocation, managing time-sharing of physical resources, and altering the physical resource mapped to a processor, without involving the operating system. The hypervisor 110 is also able to dedicate physical resources to VMs for situations where sharing is not desired. The hypervisor 110 is responsible for managing the addition or removal of physical resources. The hypervisor 110 makes these additions and deletions transparent to the upper level applications.

A hardware management console (HMC) communicates with the physical and virtual components of the computer system 100. For example, the computer workstation 920 (FIG. 3) may provide the administrative interface for various hardware and system management functions, such as logical partitioning, applying firmware and other software updates, and powering hardware components on and off. A specialized operating system of the HMC accepts administrator input, which is converted to commands and parameters that, in turn, are input to the hypervisor 110 to perform the desired system operations.

In an embodiment, the HMC may be enhanced with one or more options to support virtualized I/O adapters, such as SRIOV adapters. SRIOV is an extension to the Peripheral Component Interconnect Express (PCIe) standard, which defines a bus protocol for communication between a computer and a device. SRIOV provides I/O virtualization, such that the physical adapter appears as multiple virtual adapters, thus enabling multiple operating systems to share simultaneously a physical adapter, or for one operating system to appear to have several physical adapters. Conceptually, SRIOV provides one or more physical functions (PF), i.e., ports, and one or more virtual functions (VF). The PF may deliver the standard PCIe function for the physical ports on the physical adapter. The VF(s) provide the virtual views of the physical adapter. SRIOV-capable adapters may be used in dedicated mode, where the physical adapter is assigned to the computer, the ports are not shared, and the physical adapter is managed by a single operating system. In shared mode, the physical adapter is assigned to the hypervisor 110, and is shared by multiple operating systems simultaneously.

Each operating system accesses its assigned share of the physical adapter using one or more VFs, which may also be referred to as logical ports.

The following exemplary parameters may be communicated from the HMC to the hypervisor 110 as part of a provisioning process for configuring SRIOV adapters in the computer system, according to an embodiment of the disclosure. The hypervisor 110 may then intelligently utilize unallocated or underutilized capacity by creating and allocating VFs based on parameters and thresholds, for example.

A redundancy level parameter to the VF provisioning process may specify a number of additional I/O paths that are required for each new VF. For example, level 0 may specify no additional I/O paths and level 1 may specify one additional path.

A redundancy type parameter may specify the ability of an active VM to share redundant I/O path bandwidth with other active VMs. With shared I/O paths, redundant I/O path bandwidth may be shared with other active VMs, but with dedicated I/O paths, redundant I/O path bandwidth sharing is not enabled. The redundancy type may be dynamically converted from one redundancy type to another while the VM is active without disrupting the execution of the VM.

A VM priority value may be used by the hypervisor 110 to determine allocations of additional bandwidth. For example if two VMs require additional bandwidth, the higher priority VM will receive the bandwidth first. Any remaining available bandwidth may be allocated to the VM having the next lower priority.

A threshold bandwidth parameter for a VF may specify a value which, when reached, triggers the hypervisor 110 to create and allocate a redundant VF for the VM. Alternatively, the systems administrator may optionally choose for the hypervisor 110 to calculate and create the required number of VFs based on the redundancy level value and I/O load on the physical adapters. For example, the hypervisor 110 may periodically calculate I/O load for a physical adapter based on a running average of a percentage of usage of the adapter's bandwidth in a moving window of time. With this option, the I/O load may be balanced across physical adapters.

A parameter to pool redundant I/O path bandwidth may indicate to the hypervisor 110 to create a shared pool for all redundant I/O bandwidth from all physical adapters within a network fabric. In this context, a network fabric may refer to physical devices and the network cabling, switches, and other hardware/software components, that enables the devices to communicate with each other. More than one network fabric may be configured, particularly in a large computing environment, such as a complex cloud environment. In this configuration, a VF for a redundant I/O path is not allocated upon configuration of the primary path VF to the VM. Instead, a VF for redundant I/O path bandwidth is allocated from the shared pool as needed, for example, when a configurable threshold value on the primary I/O path VF is exceeded or when hardware predictive failure analysis indicates a potential hardware failure of the physical adapter that is assigned as the primary I/O path. Multiple shared pools may be created, one for each network fabric. Optionally, the hypervisor 110 may be configured to pool redundant I/O path bandwidth across all physical adapters.

It should be understood that although not shown, other hardware and/or software components could be used in conjunction with the computer system 100. Examples include, but are not limited to: microcode, device drivers, redundant processing units, external disk drive arrays, RAID systems, tape drives, and data archival storage systems, etc.

Figure 2:
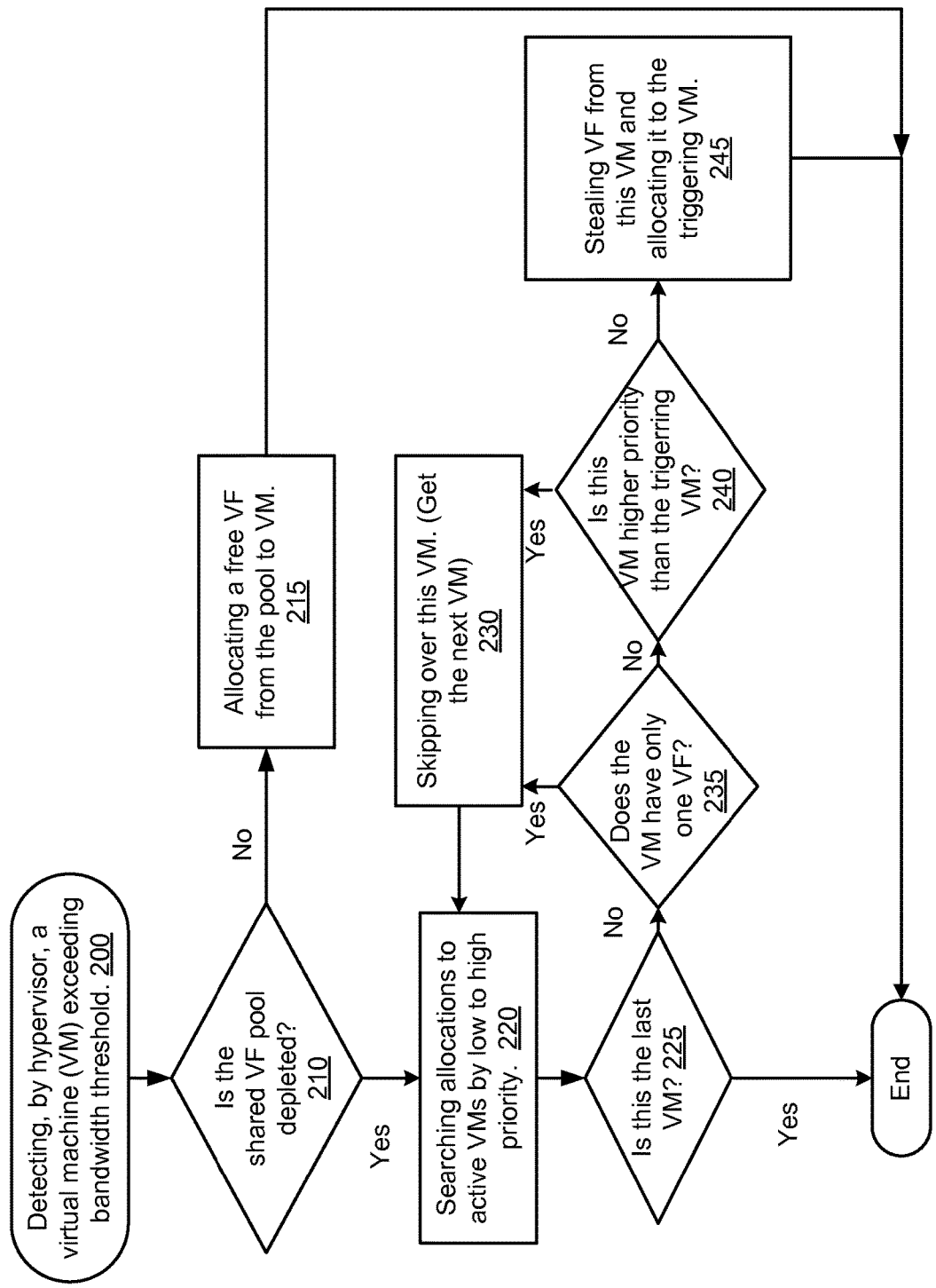
FIG. 2 is an operational flowchart for hypervisor controlled redundant I/O paths using virtualized I/O adapters, according to various embodiments of the disclosure.

FIG. 2 is an operational flowchart for hypervisor controlled redundant I/O paths using virtualized I/O adapters.

At 200 the hypervisor 110 (FIG. 1) detects a triggering event, i.e., a VM is exceeding its allocated bandwidth threshold. At 210 the hypervisor 110 checks the shared pool for free VFs that may be added to the triggering VM. If a free VF is available, at 215, the free VF is removed from the shared pool and allocated to the triggering VM. However, at 210 if the shared VF pool is depleted, at 220 the hypervisor 110 may examine each active VM from low to high priority for an available VF that may be removed from the VM and re-allocated to the triggering VM. At 225, if this is not the last VM to inspect, at 235 the next VM is examined to determine if the VM has only one VF. If it does, at 230 this VM is skipped and at 220 the next VM is examined. At 235, if this VM has more than one VF, and if at 240 the VM has a higher priority than the triggering VM, at 230 this VM is skipped and at 220 the next VM is examined. However, if at 240 the triggering VM has a higher priority than the current VM, at 245 a VF is removed from the current VM and allocated to the triggering VM. If at 225 no free VFs have been found after examining all of the VMs, no additional VFs are added to the triggering VM.

Various embodiments of the present disclosure describe managing a shared pool of bandwidth created by aggregating the VFs that may be created from a plurality of SRIOV-capable adapters. However, the method and system may similarly be applied to implement a shared pool of virtualized network interface controller (NIC) adapters, host bus adapters (HBA), or other peripheral component interconnect express (PCIe) adapters.

Table 1 illustrates an example of dynamic allocation of VFs for redundant I/O path bandwidth based on VM priority. The hypervisor periodically samples and calculates usage statistics for each VF of each VM. The sampling and calculating may be scheduled according to a configurable time parameter. VM2 and VM4 each require 2 additional I/O paths (redundancy level=2). The peak bandwidth usage of both VM2 and VM4 exceeded their threshold bandwidth usage of 2.5 Gbps and 3.2 Gbps, respectively. The hypervisor allocates additional VFs to VM2 and VM4. VM2 receives its allocation first, based on having a higher priority than VM4. A low threshold bandwidth parameter may be implemented to return unused bandwidth to the shared pool, such as where the VM's low activity leaves resources unused. For example, VM1 is allocated 2.0 Gbps of bandwidth. However, VM1's peak bandwidth usage is only 1.2 Gbps. A low threshold bandwidth parameter may allow a portion of the allocated bandwidth to be returned to the shared pool, based on the hypervisor's periodic sampling and calculating. Thus a VM may reliably operate within a calculated bandwidth window, with the hypervisor only taking exceptional handling when the VM operates outside the window.

TABLE 1

Allocating Bandwidth Based on VM Priority

| VM Name | VM Priority | Allocated Bandwidth (Gbps) | Peak Bandwidth Usage (Gbps) | Threshold (Gbps) | Redundancy Level | Redundancy Type |
|---|---|---|---|---|---|---|
| VM1 | 3 | 2.0 | 1.2 | 1.8 | 0 | N/A |
| VM2 | 1 | 3.0 | 2.8 | 2.5 | 2 | Dedicated |
| VM3 | 4 | 2.5 | 2.0 | 2.2 | 1 | Shared |
| VM4 | 2 | 4.0 | 4.0 | 3.2 | 2 | Shared |

Table 2 illustrates an example of sharing redundant VF bandwidth of lower priority VMs by higher priority VMs. This example assumes no available bandwidth in the shared pool for further allocations. The peak bandwidth usage for both VM2 and VM5 exceeds their configured threshold values of 2.5 Gbps and 1.8 Gbps, respectively. Since the shared pool is depleted, the hypervisor makes additional allocations from underutilized or lower priority VMs. In this example, VM3 is the only donor candidate, because its VM priority of 4 is lower than that of VM2 and VM4, the peak bandwidth usage of VM3 has not exceeded its threshold value, and its redundancy type of Shared indicates that excess redundant I/O path bandwidth capacity may be shared with other VMs.

TABLE 2

Sharing Bandwidth Based on VM Priority

| VM Name | VM Priority | Allocated Bandwidth (Gbps) | Peak Bandwidth Usage (Gbps) | Threshold (Gbps) | Redundancy Level | Redundancy Type |
|---|---|---|---|---|---|---|
| VM1 | 3 | 2.0 | 1.85 | 1.8 | 0 | N/A |
| VM2 | 1 | 3.0 | 2.8 | 2.5 | 1 | Dedicated |
| VM3 | 4 | 2.5 | 2.0 | 2.2 | 1 | Shared |
| VM4 | 2 | 4.0 | 3.0 | 3.2 | 2 | Shared |
| VM5 | 5 | 2.0 | 1.85 | 1.8 | 0 | N/A |

Figure 3:
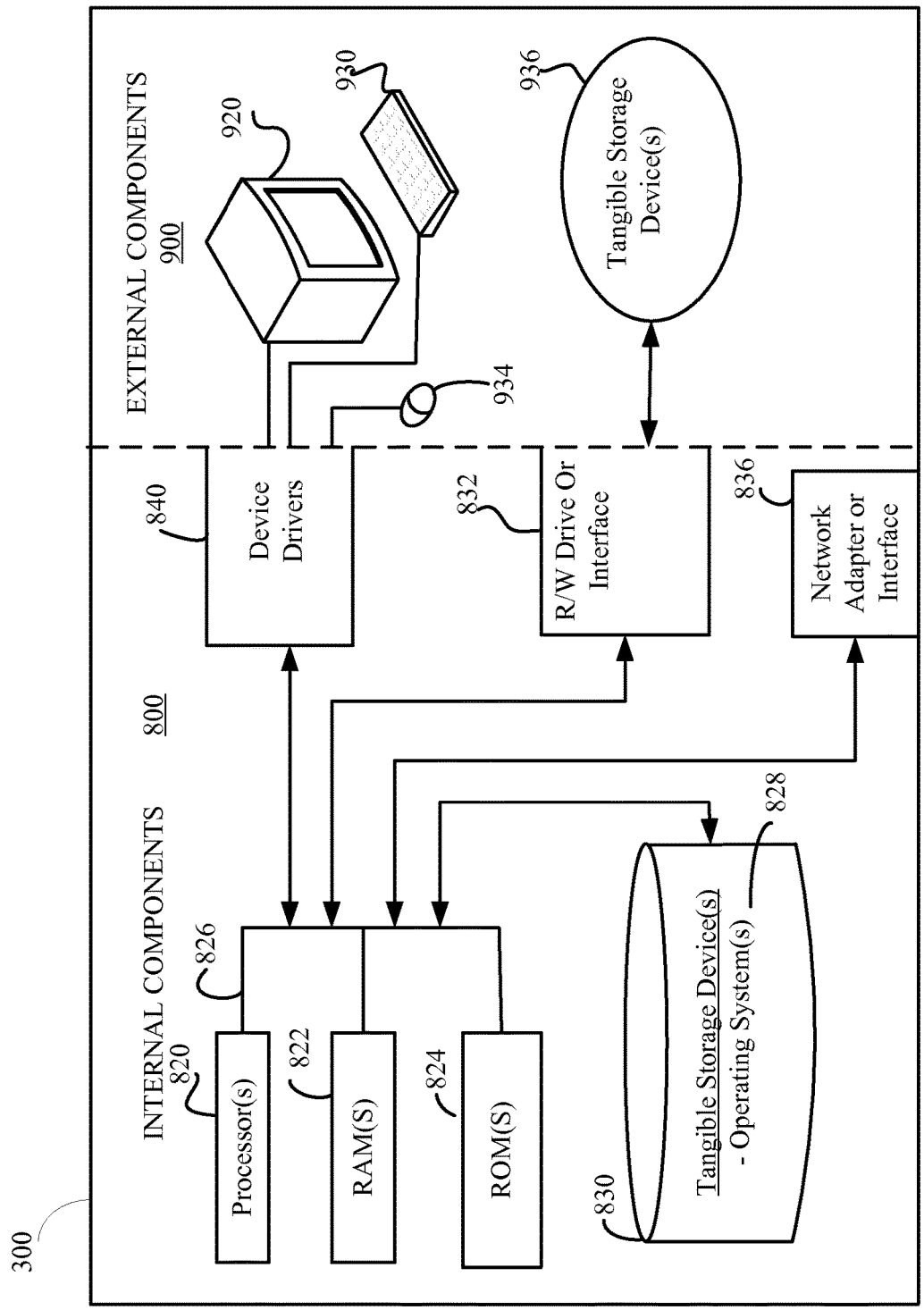
FIG. 3 is a schematic block diagram of hardware and software of the computer environment according to an embodiment of the method of FIG. 2.

Referring now to FIG. 3, computing device 300 may include respective sets of internal components 800 and external components 900 that together may provide an environment for a software application. Each of the sets of internal components 800 includes one or more processors 820; one or more computer-readable RAMs 822; one or more computer-readable ROMs 824 on one or more buses 826; one or more operating systems 828 executing the method of FIG. 2; and one or more computer-readable tangible storage devices 830. The one or more operating systems 828 (including the additional data collection facility) are stored on one or more of the respective computer-readable tangible storage devices 830 for execution by one or more of the respective processors 820 via one or more of the respective RAMs 822 (which typically include cache memory). In the embodiment illustrated in FIG. 2, each of the computer-readable tangible storage devices 830 is a magnetic disk storage device of an internal hard drive. Alternatively, each of the computer-readable tangible storage devices 830 is a semiconductor storage device such as ROM 824, EPROM, flash memory or any other computer-readable tangible storage device that can store a computer program and digital information.

Each set of internal components 800 also includes a R/W drive or interface 832 to read from and write to one or more computer-readable tangible storage devices 936 such as a CD-ROM, DVD, SSD, memory stick, magnetic tape, magnetic disk, optical disk or semiconductor storage device.

Each set of internal components 800 also includes a R/W drive or interface 832 to read from and write to one or more computer-readable tangible storage devices 936 such as a CD-ROM, DVD, SSD, memory stick, magnetic tape, magnetic disk, optical disk or semiconductor storage device.

Each set of internal components 800 may also include network adapters (or switch port cards) or interfaces 836 such as a TCP/IP adapter cards, wireless WI-FI interface cards, or 3G or 4G wireless interface cards or other wired or wireless communication links. The operating system 828 that is associated with computing device 400, can be downloaded to computing device 300 from an external computer (e.g., server) via a network (for example, the Internet, a local area network, or other wide area network) and respective network adapters or interfaces 836. From the network adapters (or switch port adapters) or interfaces 836 and operating system 828 associated with computing device 300 are loaded into the respective hard drive 830 and network adapter 836. The network may comprise copper wires, optical fibers, wireless transmission, routers, firewalls, switches, gateway computers and/or edge servers.

Each of the sets of external components 900 can include a computer workstation 920, a keyboard 930, and a computer mouse 934. External components 900 can also include touch screens, virtual keyboards, touch pads, pointing devices, and other human interface devices. Each of the sets of internal components 800 also includes device drivers 840 to interface to computer workstation 920, keyboard 930 and computer mouse 934. The device drivers 840, R/W drive or interface 832 and network adapter or interface 836 comprise hardware and software (stored in storage device 830 and/or ROM 824).

Various embodiments of the disclosure may be implemented in a data processing system suitable for storing and/or executing program code that includes at least one processor coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Although preferred embodiments have been depicted and described in detail herein, it will be apparent to those skilled in the relevant art that various modifications, additions, substitutions and the like can be made without departing from the spirit of the disclosure, and these are, therefore, considered to be within the scope of the disclosure, as defined in the following claims.

What is claimed is:

1. A method for a hypervisor controlled redundancy for Input/Output (I/O) paths using virtualized I/O adapters comprising:
   creating, by the hypervisor, a shared pool of free virtual functions (VFs) for all redundant I/O bandwidth from all physical adapters within a network fabric;
   calculating and generating, by the hypervisor, a required number of VFs based on a redundancy level value specifying a number of I/O paths required for each VF and an I/O load on a physical adapter, wherein the I/O load on the physical adapter is periodically calculated by the hypervisor according to a running average of a percentage of usage of the physical adapter's bandwidth in a moving window of time such that the I/O load is balanced across physical adapters;
   calculating, by the hypervisor, bandwidth usage statistics for each VF allocated to a plurality of active virtual machines (VM), wherein the bandwidth usage statistics for each VF are calculated based on periodically collected samples;
   based on the bandwidth usage statistics and a predefined bandwidth usage threshold, determining a triggering VM in the plurality of active VMs, as the active VM having at least one VF exceeding the predefined bandwidth usage threshold;
   in response to the triggering VM exceeding the predefined bandwidth usage threshold, checking the shared pool of free virtual VFs for a free VF;
   allocating the free VF to the triggering VM, in response to the free VF being located in the shared pool of free VFs;
   determining a VM priority value of the triggering VM and a VM priority value of each active VM in the plurality of active VMs, the VM priority value comprising a bandwidth allocation need;
   in response to the shared pool of free VFs being depleted, searching each one of the plurality of active VMs in order from low VM priority value to high VM priority value for an active VM having a VF capacity comprising at least one free VF, the active VM having at least one other VF which is not free, wherein the active VM has a redundancy type of shared, based on a redundant I/O path bandwidth being shareable with other active VMs;
   in response to locating a VM having the at least one free VF, determining whether the VM priority value of the triggering VM is higher than the VM priority value of the active VM;
   in response to the VM priority value of the triggering VM being higher than the VM priority value of the active VM, donating a VF portion from the active VM to the triggering VM;
   tracking, by the hypervisor, the donated VF portion; and
   returning an unused bandwidth portion of the active VM to the shared pool of free VFs based on at least one of:
   the triggering VM becoming inactive;
   the triggering VM bandwidth usage being below the predefined bandwidth usage threshold.

2. The method of claim 1, wherein the searching the plurality of active VMs further comprises:
   skipping the active VM based on at least one of:
   the active VM not having more than one allocated VF; and the active VM having a higher priority than the triggering VM; and
   donating at least a portion of the allocated VF from the active VM to the triggering VM.

3. The method of claim 1, wherein the shared pool comprises the I/O path bandwidth exceeding that of the primary I/O path allocations to the active VMs, and wherein the redundant I/O path bandwidth VF allocations are made from the shared pool.

4. The method of claim 1, further comprising:
   aggregating at least one Single Root I/O Virtualization (SRIOV) physical function (PF) in an SRIOV pool wherein the SRIOV pool corresponds to a network fabric.

5. The method of claim 4, wherein the redundancy type of the active VM is dynamically converted from shared to dedicated and from dedicated to shared while the active VM is active without disrupting the execution of the active VM.

6. A computer program product for hypervisor controlled redundancy for Input/Output (I/O) paths using virtualized I/O adapters comprising a non-transitory computer readable storage device readable by a processing circuit and storing instructions for execution by the processing circuit for performing a method comprising:
   creating, by the hypervisor, a shared pool of free virtual functions (VFs) for all redundant I/O bandwidth from all physical adapters within a network fabric;
   calculating and generating, by the hypervisor, a required number of VFs based on a redundancy level value specifying a number of I/O paths required for each VF and an I/O load on a physical adapter, wherein the I/O load on the physical adapter is periodically calculated by the hypervisor according to a running average of a percentage of usage of the physical adapter's bandwidth in a moving window of time such that the I/O load is balanced across physical adapters;
   calculating, by the hypervisor, bandwidth usage statistics for each VF allocated to a plurality of active virtual machines (VM), wherein the bandwidth usage statistics for each VF are calculated based on periodically collected samples;
   based on the bandwidth usage statistics and a predefined bandwidth usage threshold, determining a triggering VM in the plurality of active VMs, as the active VM having at least one VF exceeding the predefined bandwidth usage threshold;
   in response to the triggering VM exceeding the predefined bandwidth usage threshold, checking the shared pool of free virtual VFs for a free VF;
   allocating the free VF to the triggering VM, in response to the free VF being located in the shared pool of free VFs;
   determining a VM priority value of the triggering VM and a VM priority value of each active VM in the plurality of active VMs, the VM priority value comprising a bandwidth allocation need;
   in response to the shared pool of free VFs being depleted, searching each one of the plurality of active VMs in order from low VM priority value to high VM priority value for an active VM having a VF capacity comprising at least one free VF, the active VM having at least one other VF which is not free, wherein the active VM has a redundancy type of shared, based on a redundant I/O path bandwidth being shareable with other active VMs;

in response to locating a VM having the at least one free VF, determining whether the VM priority value of the triggering VM is higher than the VM priority value of the active VM;

in response to the VM priority value of the triggering VM being higher than the VM priority value of the active VM, donating a VF portion from the active VM to the triggering VM;

tracking, by the hypervisor, the donated VF portion; and returning an unused bandwidth portion of the active VM to the shared pool of free VFs based on at least one of:
 the triggering VM becoming inactive;
 the triggering VM bandwidth usage being below the predefined bandwidth usage threshold.

7. The computer program product of claim 6, wherein the searching the plurality of active VMs further comprises:
 skipping the active VM based on at least one of:
  the active VM not having more than one allocated VF; and
  the active VM having a higher priority than the triggering VM; and
 donating at least a portion of the allocated VF from the active VM to the triggering VM.

8. The computer program product of claim 6, wherein the shared pool comprises the I/O path bandwidth exceeding that of the primary I/O path allocations to the active VMs, and wherein the redundant I/O path bandwidth VF allocations are made from the shared pool.

9. The computer program product of claim 6, further comprising:
 aggregating at least one Single Root I/O Virtualization (SRIOV) physical function (PF) in an SRIOV pool wherein the SRIOV pool corresponds to a network fabric.

10. A computer system for hypervisor controlled redundancy for Input/Output (I/O) paths using virtualized I/O adapters comprising a memory, a processing unit communicatively coupled to the memory, wherein the computer system is capable of performing the steps of a method comprising:
 creating, by the hypervisor, a shared pool of free virtual functions (VFs) for all redundant I/O bandwidth from all physical adapters within a network fabric;
 calculating and generating, by the hypervisor, a required number of VFs based on a redundancy level value specifying a number of I/O paths required for each VF and an I/O load on a physical adapter, wherein the I/O load on the physical adapter is periodically calculated by the hypervisor according to a running average of a percentage of usage of the physical adapter's bandwidth in a moving window of time such that the I/O load is balanced across physical adapters;
 calculating, by the hypervisor, bandwidth usage statistics for each VF allocated to a plurality of active virtual machines (VM), wherein the bandwidth usage statistics for each VF are calculated based on periodically collected samples;
 based on the bandwidth usage statistics and a predefined bandwidth usage threshold, determining a triggering VM in the plurality of active VMs, as the active VM having at least one VF exceeding the predefined bandwidth usage threshold;
 in response to the triggering VM exceeding the predefined bandwidth usage threshold, checking the shared pool of free virtual VFs for a free VF;
 allocating the free VF to the triggering VM, in response to the free VF being located in the shared pool of free VFs;
 determining a VM priority value of the triggering VM and a VM priority value of each active VM in the plurality of active VMs, the VM priority value comprising a bandwidth allocation need;
 in response to the shared pool of free VFs being depleted, searching each one of the plurality of active VMs in order from low VM priority value to high VM priority value for an active VM having a VF capacity comprising at least one free VF, the active VM having at least one other VF which is not free, wherein the active VM has a redundancy type of shared, based on a redundant I/O path bandwidth being shareable with other active VMs;
 in response to locating a VM having the at least one free VF, determining whether the VM priority value of the triggering VM is higher than the VM priority value of the active VM;
 in response to the VM priority value of the triggering VM being higher than the VM priority value of the active VM, donating a VF portion from the active VM to the triggering VM;
 tracking, by the hypervisor, the donated VF portion; and
 returning an unused bandwidth portion of the active VM to the shared pool of free VFs based on at least one of:
  the triggering VM becoming inactive;
  the triggering VM bandwidth usage being below the predefined bandwidth usage threshold.

11. The computer system of claim 10, wherein the searching the plurality of active VMs further comprises:
 skipping the active VM based on at least one of:
  the active VM not having more than one allocated VF; and
  the active VM having a higher priority than the triggering VM; and
 donating at least a portion of the allocated VF from the active VM to the triggering VM.

12. The computer system of claim 10, further comprising:
 aggregating at least one Single Root I/O Virtualization (SRIOV) physical function (PF) in an SRIOV pool wherein the SRIOV pool corresponds to a network fabric.

* * * * *